US010764370B2

(12) United States Patent
Srinivasan et al.

(10) Patent No.: US 10,764,370 B2
(45) Date of Patent: Sep. 1, 2020

(54) HYBRID CLOUD MIGRATION DELAY RISK PREDICTION ENGINE

(71) Applicant: Accenture Global Solutions Limited, Dublin (IE)

(72) Inventors: Madhan Kumar Srinivasan, Bengaluru (IN); Arun Purushothaman, Chennai (IN); Guruprasad Pv, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/966,599

(22) Filed: Apr. 30, 2018

(65) Prior Publication Data

US 2019/0182323 A1 Jun. 13, 2019

(30) Foreign Application Priority Data

Dec. 11, 2017 (IN) .............................. 201741044450

(51) Int. Cl.
| | | |
|---|---|---|
| G06F 15/16 | (2006.01) | |
| H04L 29/08 | (2006.01) | |
| G06Q 10/06 | (2012.01) | |
| G06F 9/50 | (2006.01) | |
| G06F 9/48 | (2006.01) | |

(52) U.S. Cl.
CPC ........ H04L 67/1097 (2013.01); G06F 9/4856 (2013.01); G06F 9/5072 (2013.01); G06F 9/5088 (2013.01); G06Q 10/0631 (2013.01); G06Q 10/0635 (2013.01)

(58) Field of Classification Search
CPC ........................... H04L 67/1097; G06F 9/4856

USPC ........................................................ 709/223
See application file for complete search history.

(56) References Cited

U.S. PATENT DOCUMENTS

| | | | |
|---|---|---|---|
| 2014/0149517 A1 | 5/2014 | Greinhofer et al. | |
| 2015/0379426 A1* | 12/2015 | Steele | G06N 20/00 706/12 |
| 2016/0092801 A1* | 3/2016 | Carden | G06Q 10/0631 705/7.12 |
| 2019/0037002 A1* | 1/2019 | Arunachalam | H04L 41/147 |

FOREIGN PATENT DOCUMENTS

EP 2746939 A1 6/2014

OTHER PUBLICATIONS

Extended Search Report issued on European patent application No. 18198706.6 dated May 2, 2019, 12 pages.
Examination Report No. 1 for Australian Patent Application No. 2018260855 dated Jul. 29, 2019; 4 pages.
Australian Examination Report No. 2, dated Apr. 21, 2020, pp. 1-5, issued in Australian Patent Application No. 2018260855, Offices of IP Australia, Woden ACT, Australia.

* cited by examiner

*Primary Examiner* — Dustin Nguyen
*Assistant Examiner* — Joel Mesa
(74) *Attorney, Agent, or Firm* — Brinks Gilson & Lione (57) ABSTRACT

A cloud migration tool manages and monitors a cloud migration project that migrates data from a legacy environment to a target data center environment. The cloud migration tool includes an analytics engine that applies data regression models to generate a delay risk prediction for activities that are scheduled during the cloud migration project.

22 Claims, 9 Drawing Sheets

HYBRID CLOUD MIGRATION DELAY RISK PREDICTION ENGINE

CROSS-REFERENCE TO RELATED APPLICATION(S)

This application claims priority to Indian Patent Application No. 201741044450, filed on Dec. 11, 2017, the entirety of which is hereby incorporated by reference herein.

TECHNICAL FIELD

This disclosure relates to cloud migration management and cloud migration activity delay risk prediction provided by an optimized predictive analytics engine.

BACKGROUND

Rapid advances in communications and storage technologies, driven by immense customer demand, have resulted in widespread adoption of cloud systems for managing large data payloads, distributed computing, and record systems. With the increased focus on utilizing cloud systems to store and run enterprise systems, the steps involved in a cloud migration (e.g., either from a non-cloud legacy environment to a cloud system environment, or between cloud system environments) have become an area of interest. As cloud migration projects may involve the migration of large amounts of data and applications, solutions for reducing a time it takes to run and complete a cloud migration project are an area of interest.

DETAILED DESCRIPTION

In order to take advantage of the benefits offered by a cloud computing system, existing legacy data must first be migrated to a cloud system. Cloud migration can be a major project requiring a large amount of resources to accomplish as it involves the transfer of large amounts of data, applications, systems, and/or other enterprise system instances from one data storage infrastructure to another data storage infrastructure. In addition to the resource drain, managing such a cloud migration project may also be cost prohibitive for enterprises. Adding to the already resource intensive cloud migration project, are unexpected delays. As many of the processes involved in the cloud migration process are serial and dependent on each other, a single delay may have a ripple effect of delaying the overall cloud migration project. Furthermore, reducing delays in the cloud migration becomes an important consideration for enterprises that are managing the cloud migration project as they may not be compensated until the cloud migration project has been completed, as well as losing out on support services to the client that only begins once they are onboard the cloud system. On the other side, a client having their data, applications, and/or other instances migrated to the cloud system will not be able to fully utilize their reliant services on the cloud system until the cloud migration project has been completed.

Accordingly, there is a need to introduce a cloud migration management tool that is able to utilize computing resources to plan, validate, execute, and provide risk prediction features over a cloud migration project. Thus, a hybrid cloud migration delay risk prediction engine (HCMDRP engine) is disclosed that includes an analytics engine (e.g., HyCMR Analytics Engine developed by Accenture®) that provides a technical solution to the technical problem of system inefficiencies related to unpredicted migration activity delays, by increasing the utilization of cloud computing resources to produce a risk prediction for activity delays during a cloud migration project. The analytics engine facilitates in intelligently identifying/predicting delay risks and presents this information in an easy to understand graphical user interface (GUI) presentation for decision makers, who are then able to dictate further actions to avoid the risks.

The analytics engine embedded in the HCMDRP engine, helps in predicting the migration activity delays for upcoming migration waves. For example, the analytics engine formats various activity reports gathered during the cloud migration into a data format ready to be analyzed by the analytics engine for accurate activity risk prediction. The analytics engine may further analyze any combination of historical cloud migration activity data and current cloud migration activity data, and apply AI/machine learning techniques (e.g., Random Forest modeling, Support Vector Machines, Artificial Neural Network etc.), to predict risks to the cloud migration such as activity delays. While this disclosure describes a cloud migration from a traditional infrastructure to a cloud infrastructure, the disclosed features may also be applicable in cloud migration projects between existing cloud infrastructures that include either public cloud or private cloud. Although the cloud migration may be described in terms of migrating data, it is noted that the data being transferred in the cloud migration projects may include individual data, applications, systems, and/or other enterprise system instances.

A cloud migration project includes various aspects such as discovering a system's architecture, understanding of technical and process integration points (e.g., between a traditional infrastructure environment and a cloud system environment where the applications and data are being migrated to), performing the actual cloud migration, testing the migrated data after the cloud migration, and post-migration processes for ensuring the long term success and co-existence with both existing and new systems following the cloud migration to the cloud system. Each activity accounted for during the cloud migration project may be attributed to either a cloud migration process or tool resource, or attributed to a human resource. It follows that each delay during the cloud migration project may also be attributed to a cloud migration process resource (e.g., internet connection breaks down or is slower than expected) or tool resource (e.g., HCMDRP Engine enters an unexpected loop), or human resource (e.g., agent responsible for implementing a migration task requires approval from a manager that is unavailable). Each delay that occurs during the cloud migration project has the potential to delay other downstream activities due to the serial nature of the cloud migration project.

Figure 1:
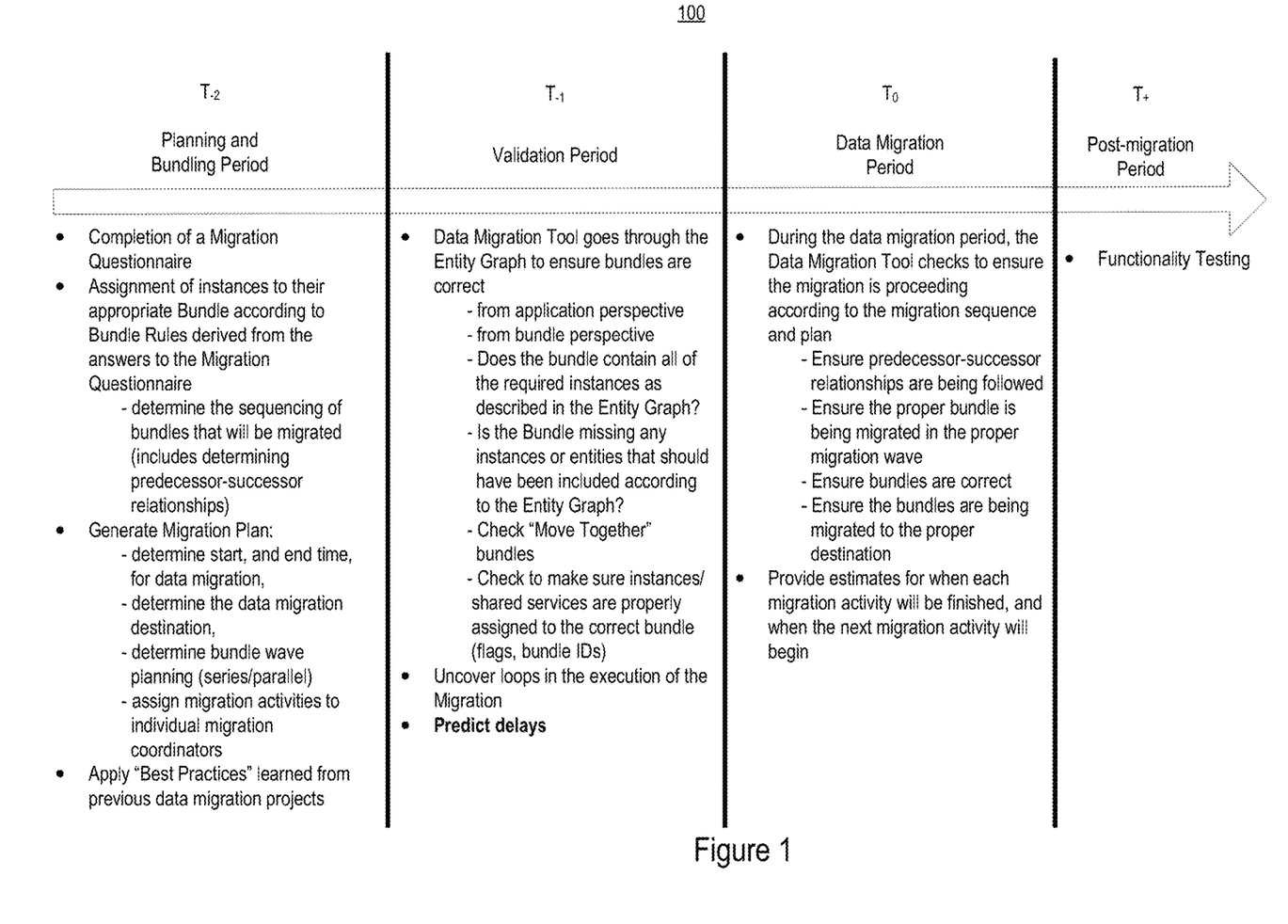
FIG. 1 shows an exemplary timeline for a cloud migration project.
Figure 3:
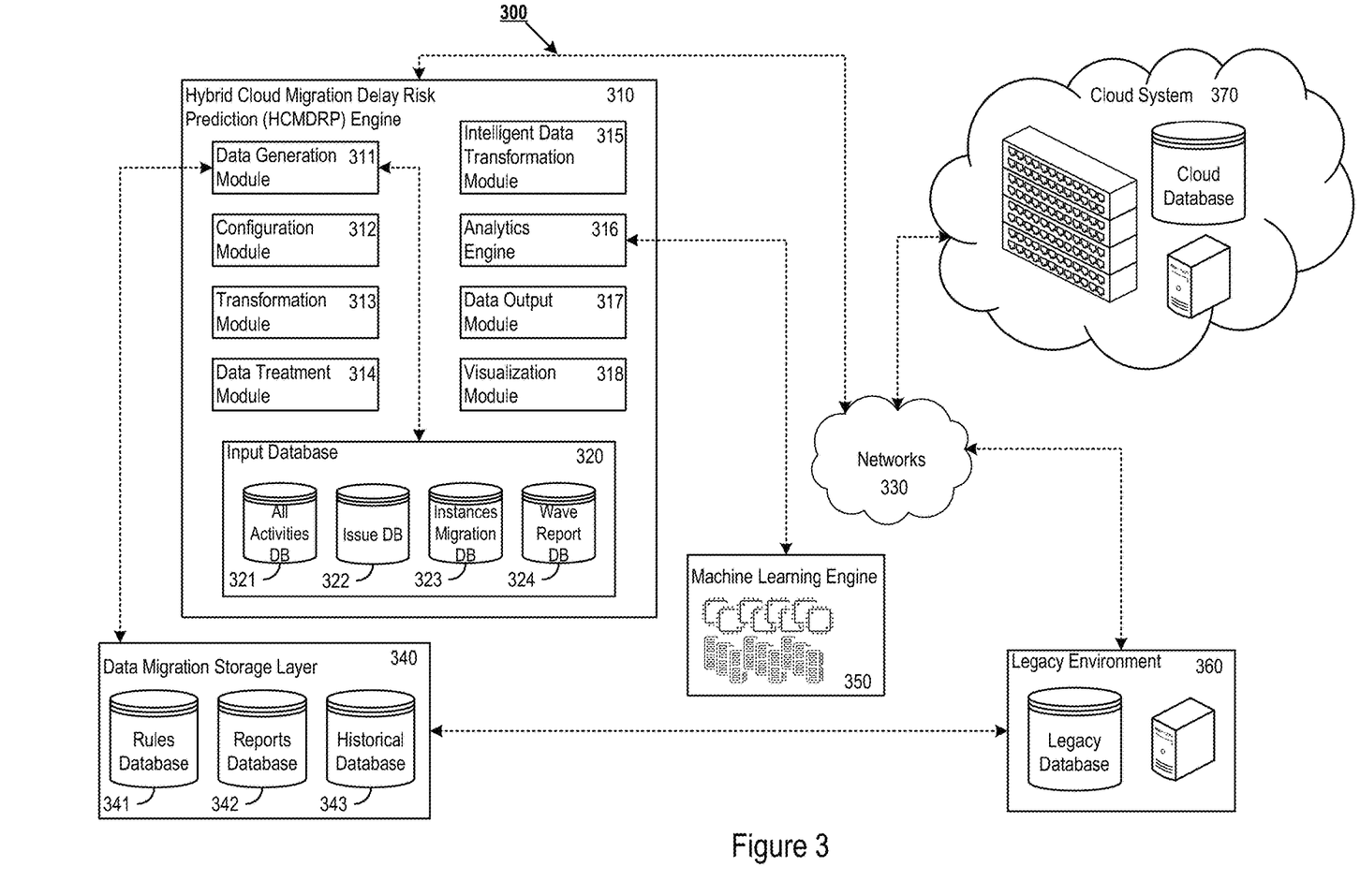
FIG. 3 shows an exemplary hybrid cloud migration delay risk prediction engine.

FIG. 1 illustrates an exemplary timeline 100 of events that may occur during the implementation of a cloud migration project for a client, where a Hybrid Cloud Migration Delay Risk Prediction (HCMDRP) Engine implements certain activities for managing the cloud migration project. Other activities during the cloud migration project may be assigned to other resources such as managers, virtual machines, or other tools operating for the cloud migration project. An exemplary cloud migration system 300 for managing a cloud migration project from a legacy environment 360 to a cloud system 370, via a networks 330, is illustrated in FIG. 3. The legacy environment may be either a traditional infrastructure or another cloud system. The cloud migration system 300 includes the HCMDRP Engine 310 that will be referenced during the description of the timeline 100. The network 330 provides connectivity between the resources, resource descriptors, service providers, enterprises, and other globally positioned entities. The networks 330 may include private and public networks defined over any pre-determined and possibly dynamic internet protocol (IP) address ranges. The network 330 may be representative of one or more networks.

The cloud migration project represented by the timeline 100 is partitioned into four exemplary time periods: $T_{-2}$, $T_{-1}$, $T_0$, and $T_+$. The time period $T_0$ represents a time period during which the cloud migration is executed. The time periods $T_{-2}$ and $T_1$ represent two earlier time periods occurring days or weeks prior to the cloud migration, during which various preparatory measures are executed. The time period $T_+$ represents a time period occurring after the cloud migration, and may include such features as functionality testing to test the migrated data to ensure they are being utilized appropriately following the cloud migration.

During the time period $T_{-2}$, information requested on a Migration Questionnaire may be provided. For example, a portion of the migration questionnaire may ask the client to input one or more bundling rules for grouping applications and other data stored on the client's data servers into individual bundle units. A bundle unit may be considered the smallest unit of data assigned for migration together during the execution of the cloud migration. One example of a bundle rule is to have all applications and/or other data that are stored on a common data server or database within the legacy environment 360 to be bundled into a common bundle unit. Another example of a bundle rule may be centered around a common shared service, such that one or more applications and/or other related data that are executed during the implementation of the shared service are bundled into a common bundle unit. Data comprising a bundle unit may be stored on a common data server, or may be stored across multiple data servers within the legacy environment 360.

In addition to the bundling rules input through the migration questionnaire, the HCMDRP Engine 310 may accept historical bundling rules from previous cloud migration projects. For example, the HCMDRP Engine 310 may bring in a historical bundling rule that has been recognized as providing an efficient method for bundling data during a prior cloud migration project sharing similar attributes as the current cloud migration project, or reduce a risk assessment related to predicted delays. The historical bundling rule may be obtained from a rules database 341 or a historical database that stores a list of historical bundling rules that have been identified as following cloud migration best practices. The rules database 341 may be accessible by the HCMDRP Engine 310 as part of a cloud migration storage layer 340 that further includes a reports database 342 and the historical database 343. The historical bundling rules may take the form of predefined templates applied to certain applications, instances, or entities associated with a bundle unit, that describe a specific sequence for implementing migration activities of the data and applications that comprise the respective bundle unit.

After receiving the bundling rules, the HCMDRP Engine 310 may generate a migration plan according to each of the implemented rules by assigning data into their appropriate bundle unit according to the bundling rules. The migration plan may further assign bundle units to a respective migration wave according one or more wave assignment rules. For example, a wave assignment rule may specify certain bundle units to be assigned to a common cloud migration wave so that the application data included in the bundle units may be migrated together. Such wave assignment rules may be received by the HCMDRP Engine 310 through the migration questionnaire, or accessed from the rules database 341. The HCMDRP Engine 310 may also apply historical wave assignment rules accessed from the rules database 341 or historical database 343, when the historical wave assignment rules are determined to offer a benefit such as increased efficiency or reduced risk assessment related to predicted delays. The historical wave assignment rules may take the form of predefined templates applied to bundles within a data migration wave, that describe a specific sequence for implementing migration activities corresponding to the respective bundle units that comprise the data migration wave.

Figure 2:
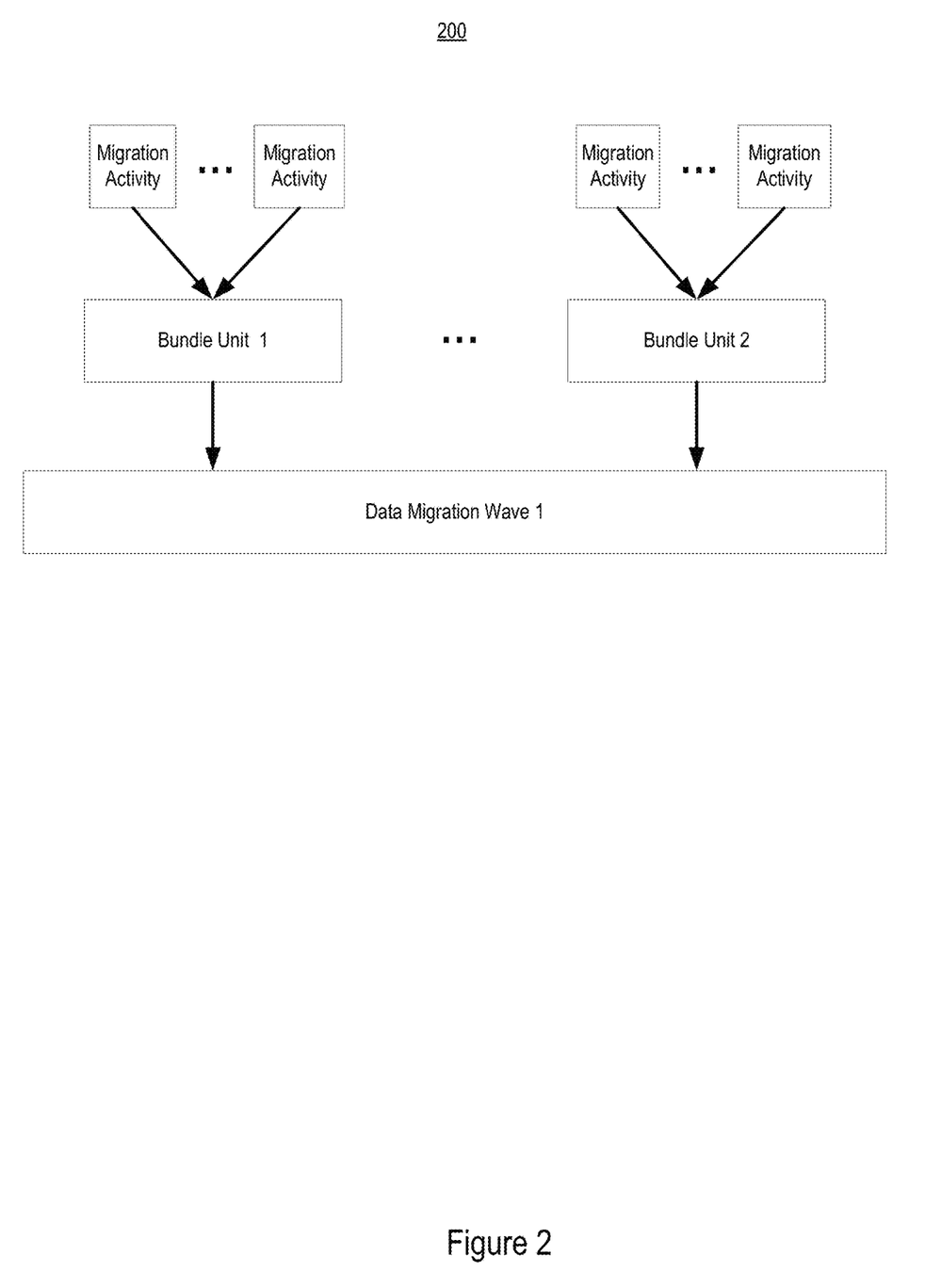
FIG. 2 shows an exemplary entity graph for a cloud migration wave.

The migration plan itself may be stored in the reports database 342. FIG. 2 illustrates an exemplary entity graph 200 showing an exemplary cloud migration wave, the bundle units assigned to the cloud migration wave, and the data assigned to the bundle units.

The migration plan generated by the HCMDRP Engine 310 may include a start and end time for the cloud migration. For instance, the start time for the cloud migration portion may coincide with the start time for the time period $T_0$, and the end time for the cloud migration portion may coincide with the end time for the time period $T_0$. The migration plan may also be generated to identify the destination data storage within the cloud system 370 for migrating one or more of the bundle units in the cloud migration project.

In some embodiments, the HCMDRP Engine 310 may reference a set of destination rules for determining a cloud migration destination for a particular bundle unit (e.g., the destination rules may be included in the rules database 341). The destinations rules may identify a destination data storage within the cloud system 370 system, and in some cases more specifically a destination data server within the cloud system 370, based on characteristics of the bundle unit and/or the destination data storage system and destination data server. For example, the destination rules may indicate that bundle units that include application data related to highly sensitive information are to be migrated to destination data servers within the cloud system 370 that can offer secure storage of the application data (e.g., application data may be encrypted upon storage on the secure data server). In this way, the HCMDRP Engine 310 may reference the destination rule(s), determine characteristics of the bundle units, and locate one or more destination data storage systems within the cloud system 370 (or more specifically destination data servers) for migrating the bundle units while satisfying the destination rule(s).

The migration plan may also include a list of migration activities that comprises the cloud migration project, as well as an assignment list that assigns one or more resources to each of the migration activities. The assigned resources are then responsible for ensuring the assigned activity is completed.

The migration plan may be generated to further include a cloud migration sequence that includes a sequence in which cloud migration waves are migrated relative to other cloud migration waves comprising the cloud migration project. The HCMDRP Engine 310 may apply sequencing rules to determine the cloud migration sequence, where the sequencing rules are received from the migration questionnaire. The HCMDRP Engine 310 may also apply historical sequencing rules accessed from the rules database 341 based on determined benefits of applying the sequencing rules, such as increased efficiency or reduced risk prediction related to delays.

Still during the time period $T_{-2}$, the HCMDRP Engine 310 may generate an entity map based on the gathered information, where the entity map is a visualization data structure that provides the structural relationship between data, bundle units, and cloud migration waves that comprise the cloud migration project. FIG. 2 illustrates the exemplary entity graph 200.

Following the time period $T_{-2}$, the cloud migration project enters the validation period $T_{-1}$. During the validation period $T_{-1}$, the HCMDRP Engine 310 may parse through the entity graph to ensure that the data, bundle units and cloud migration waves are structured in accordance to the relationships and various rules that have been implemented under the migration plan.

During the validation period $T_{-1}$, the HCMDRP Engine 310 may also uncover unwanted loops in the entity graph. Loops may result in a disruptive situation where the cloud migration becomes stuck in a circular loop that does not allow the cloud migration to proceed to migrating a next data, next bundle unit, or next cloud migration wave. An unwanted loop may occur in the entity graph due to improper sequencing rules that force the cloud migration to be either stuck going back to a same activity, or leaves the cloud migration without a viable next activity to progress the cloud migration. Therefore, the HCMDRP Engine 310 parses the entity graph during the validation period $T_{-1}$ to uncover unwanted loops and fix them to allow the migration process to progress through all of the application data of the cloud migration project without undue delay. The migration plan and entity graph is updated by the HCMDRP Engine 310 with any fixes that are made to cure detected unwanted loops.

The HCMDRP Engine 310 may also generate predicted delays for the cloud migration project during the validation period $T_{-1}$. The predicted delays assign a predicted delay risk score to each activity scheduled during the cloud migration project. In addition to generating the predicted delays, the HCMDRP Engine 310 may generate proposed fixes for the predicted delays, as well as generate a graphical user interface (GUI) for presenting the predicted delays in an efficient and effective manner to a cloud migration project manager. Further details on the delay prediction strategy is provided herein.

Following the planning and bundling period $T_{-2}$ and validation period $T_{-1}$, the cloud migration project is prepped to start the cloud migration portion at the cloud migration period $T_0$. The cloud migration portion of the cloud migration project is implemented by migrating the data and bundle units in their corresponding cloud migration waves according to the entity graph and migration plan. During the cloud migration period $T_0$, the HCMDRP Engine 310 may monitor the cloud migration to ensure that the cloud migration is implemented according to the migration plan. In addition, the HCMDRP Engine 310 may also provide estimates for when each migration activity during the cloud migration portion will be completed. The HCMDRP Engine 310 may also provide a time when an upcoming cloud migration activity is scheduled, or predicted, to commence.

Following the cloud migration period $T_0$, migrated data may be subjected to functionality testing during a post-migration period $T_+$.

Described in more detail, the HCMDRP Engine 310 illustrated in FIG. 3 includes a data generation module 311, a configuration module 312, a transformation module 313, a data treatment module 314, an intelligent data transformation module 315, an analytics engine 316, a data output module 317, and a visualization module 318. Each module includes the software, hardware, and circuitry for implementing the features attributed to the respective module. The HCMDRP Engine 310 further includes an input database 320 including an all activities database (DB) 321, an issue DB 322, an instances migration DB 323, and a wave report DB 324. The information stored on the input database 320, as well as the modules comprising the HCMDRP Engine 310, are utilized by the analytics engine 316 to generate the predicted delays. For example, some of the modules apply data analytics and formatting on the data stored on the input database 320 before presenting the data to the analytics engine 316, which will be described in more detail below.

The data generation module 311 obtains cloud migration related data from various sources, and stores them into respective databases within the input database 320. The all activities DB 321 may store cloud migration information related to activities that comprise historical cloud migration projects, including one or more of cloud migration wave identification, cloud migration bundle information, cloud migration project managing resource information (e.g., resources that are assigned to specific activities), activity name, activity description, activity deadline, activity status, activity planned start time, activity actual start time, activity planned completion time, activity actual completion time, or other activity related information. The information stored in the all activities DB 321 may be obtained from the historical database 343 storing the historical performance of past cloud migration projects. The specific historical data obtained from the historical database 343 for storage on the all activities DB 321 may be optimized to include a most recent set of historical data (e.g., last years' worth of historical data) to more accurately reflect recent cloud migration trends.

The issue DB 322 may store cloud migration information related to detected issues from previous cloud migration projects, including one or more of an issue name, issue category, issue description, issue priority, issue status, issue resolution, resource information associated with an issue, activity information that resulted in the issue (e.g., activity name, activity status, activity type), and data attribute information for the data associated with the issue (e.g., cloud migration wave information, cloud migration bundle information). The information stored in the issue DB 322 may be obtained from the historical database 343.

The instances migration DB 323 may store cloud migration information related to the legacy environment 360 and the target destination of the data on the cloud system 370, including one or more of cloud migration wave information, cloud migration bundle information, legacy environment 360 data center attribute information (e.g., host name, data center name, host type, internet protocol (IP) address, operating system, hardware capabilities), as well as the target cloud system 370 attribute information (e.g., host name, data center name, host type, internet protocol (IP) address, operating system, hardware capabilities). The information stored in the instances migration DB 323 may be obtained from the reports database 342, as well as information obtained from the legacy environment 360 and the cloud system 370.

The wave report DB 324 may store cloud migration information related to the cloud migration waves, including one or more of a system platform, data function, criticality status, associated cloud migration wave name, associated cloud migration wave date, associated cloud migration bundle name, associated operating system, legacy data center name, target data center name, data inventory serial number, data inventory status, committed status, or any other information describing activities in the migration plan. The information stored in the wave report DB 324 may be obtained from the reports database 342 storing the migration plan.

The HCMDRP Engine 310 also includes the configuration module 312 configured to transform the information stored in the input database 320 into a format that is compatible for the analytics engine 316 to parse and analyze for predicted delays. For example, activity information may be extracted and formatted into an activity data frame. The HCMDRP Engine 310 also includes the transformation module 313 configured to transform the data supplied to the analytics engine 316 with any necessary transformations, such as arranging the activity information in the activity data frame into a chronological sequence order, thus resulting in a sequential activity data frame. The HCMDRP Engine 310 also includes the data treatment module 314 configured to treat the data within the sequential activity data frame for outliers, missing values, and multicollinearity (as defined by a predetermined values and thresholds). The HCMDRP Engine 310 also includes intelligent data transformation module 315 configured to assign a host of weights across several significant variables and apply qualitative data reduction techniques on other variables that are included in a delay prediction algorithm executed by the analytics engine 316.

The analytics engine 316 is configured to receive the sequential activity data frame as a sample dataset and control a machine learning engine 350 to run a machine learning model on the activity information stored within the sequential activity data frame. For example, a Random Forest Regression model may be employed by the analytics engine 316 across activities from various cloud migration approaches and multiple clients (e.g., the historical cloud migration performance data attributed to certain activities may be obtained from historical database 343) as it was best suited in terms of predictive power and accuracy given all the sets of transformations (and constraints) that were applied in the prior steps and the objective of the HCMDRP Engine 310.

The data output module 317 includes two features. A first feature generates a delay prediction report that details the various delays predicted for the activities and their importance in terms of risk and their position within the pipeline of sequential activities that comprise the cloud migration project. The issue report helps in identifying root causes for historical delays (either human centric or not). A second feature stores model parameters after each run of the delay prediction, thus allowing the model parameters to be used for future delay prediction analysis. The model parameters may be stored in the historical database 343.

The visualization module 318 generates GUIs for display that present the various reports generated by the analytics engine 316, including the risk prediction results. The risk prediction results generated by the analytics engine 316 are presented in the GUI to aid an end-user to prioritize upcoming cloud migration waves in the upcoming time period (e.g., upcoming days, weeks, months) based on the risk prediction score calculated for each data migration activity. An aggregate risk prediction score is also calculated for each bundle unit that is the average of the risk prediction scores for each activity within the respective bundle unit, and an aggregate risk prediction score is calculated for each data migration wave that is the average of the risk prediction scores for each bundle unit within the respective data migration wave.

Figure 5:
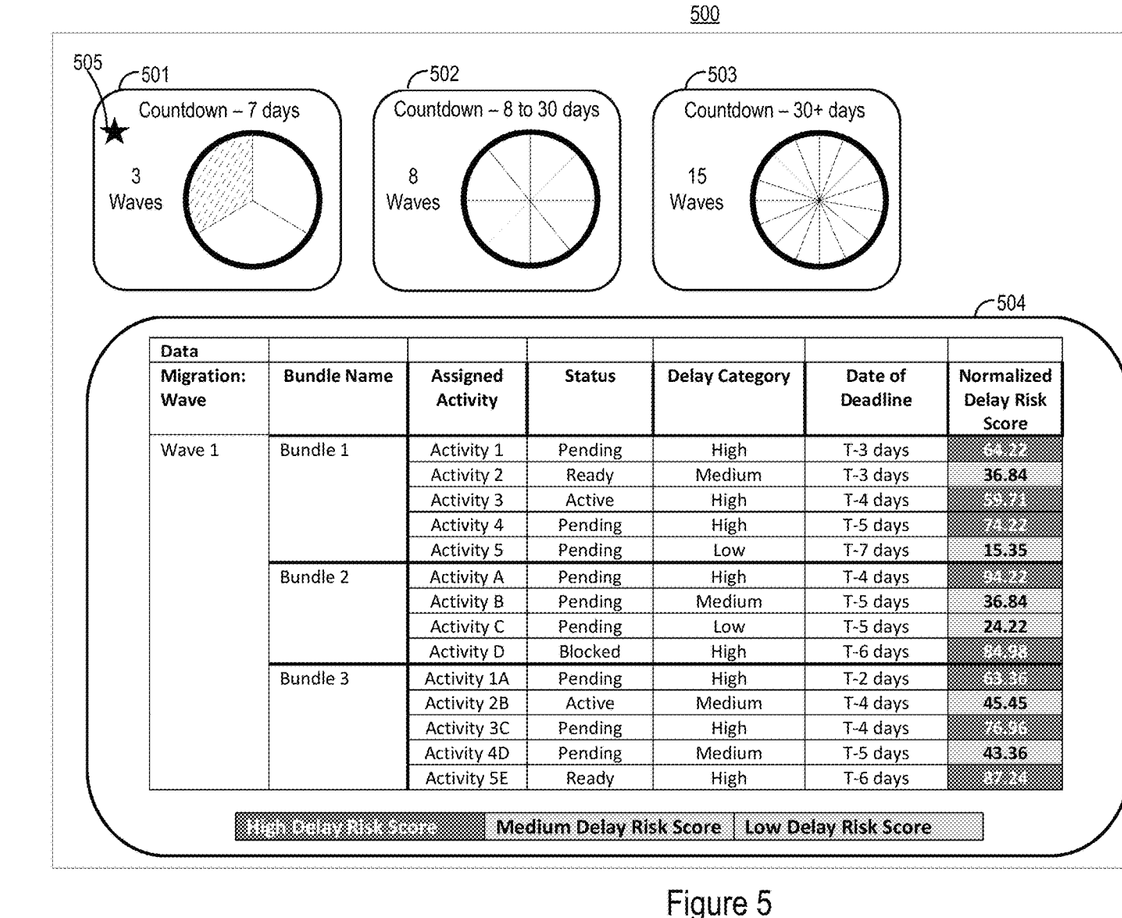
FIG. 5 shows an exemplary screen shot of a graphical user interface generated by the hybrid cloud migration delay risk prediction engine.

An exemplary screen shot 500 for the delay prediction report is illustrated in FIG. 5. The exemplary screen shot 500 is part of a graphical user interface (GUI) that displays activities within the cloud migration project that are predicted to produce delays. The screen shot 500 includes groupings of cloud migration waves that include activities that are a set number of days out from the cloud migration. For example, a first group 501 groups three cloud migration waves that are scheduled for cloud migration activities seven days out, a second group 502 groups eight cloud migration waves that are scheduled for cloud migration activities between eight and thirty days out, and a third group 503 groups fifteen cloud migration waves that are scheduled for cloud migration activities more than thirty days out. The pie graph visualization within each of the first group 501, the second group 502, and the third group 503 may be partitioned to represent a number of corresponding data migration waves that are categorized into a predetermined delay category states. For example, the screen shot 500 includes at least three predetermined delay category states: low, medium, and high. The pie graph visualization within each of the first group 501, the second group 502, and the third group 503 may further be color coded (or otherwise marked up) to show a number of data migration waves that are categorized into the risk categories such as the high delay risk (red), the medium delay risk (yellow), or a low delay risk (green). A high delay risk may indicate activities that will need to be modified to avoid undue delays, a medium delay risk may indicate activities under caution to keep an eye on, and a low delay risk may indicate low risk activities that pose little to no risk of delays. In the screen shot 500, the first group 501 is selected. Based on the selection of the first group 501, a data migration wave predicted to have a high delay risk is highlighted.

A main display 504 is provided that displays a cloud migration wave selected from the first group 501 (as indicated by marker 505), along with various attributes related to predicted delays for each activity within the cloud migration wave. The data migration wave described in the main display 504 may correspond to the data migration wave highlighted in the first group 501 as having the high delay risk. The data migration wave described in the main display 504 is broken down into its bundle units, and each bundle unit is broken down into the activities for migrating the data and applications within the bundle unit. For each activity, the analytics engine 316 calculates a delay risk score according to a delay risk score calculation process described herein. For example, the delay risk score is computed by applying "risk-based" weights across the current status of the activity, days to deadline (e.g., within 7 days, 8-30 days, 30+ days) and the actual predicted delay. For example: Within "Status", an 'Active' status is assigned a higher risk weightage over a "ending" or a 'Ready' status. After all such internal weights are assigned, feature level weights are applied to these three variables.

For presentation in the main display 504, the visualization module 318 categorizes the calculated delay risk scores into specific ranges of predicted delay risk scores, and further color codes the delay risk scores in the main display 504 to represent the different levels of predicted delay risks. High delay risk scores are color coded in red, medium delay risk scores are color coded in yellow, and low delay risk scores are color coded in green.

When a user selects an activity having a high delay risk score, the visualization module 318 may respond by displaying a list of one or more recommend actions to reduce or eliminate the predicted delay. The visualization module 318 may also generates GUIs for display that present details about the cloud migration project such as migration economics, wave readiness, history of previously migrated platforms, and specific cloud migration milestones.

Figure 4:
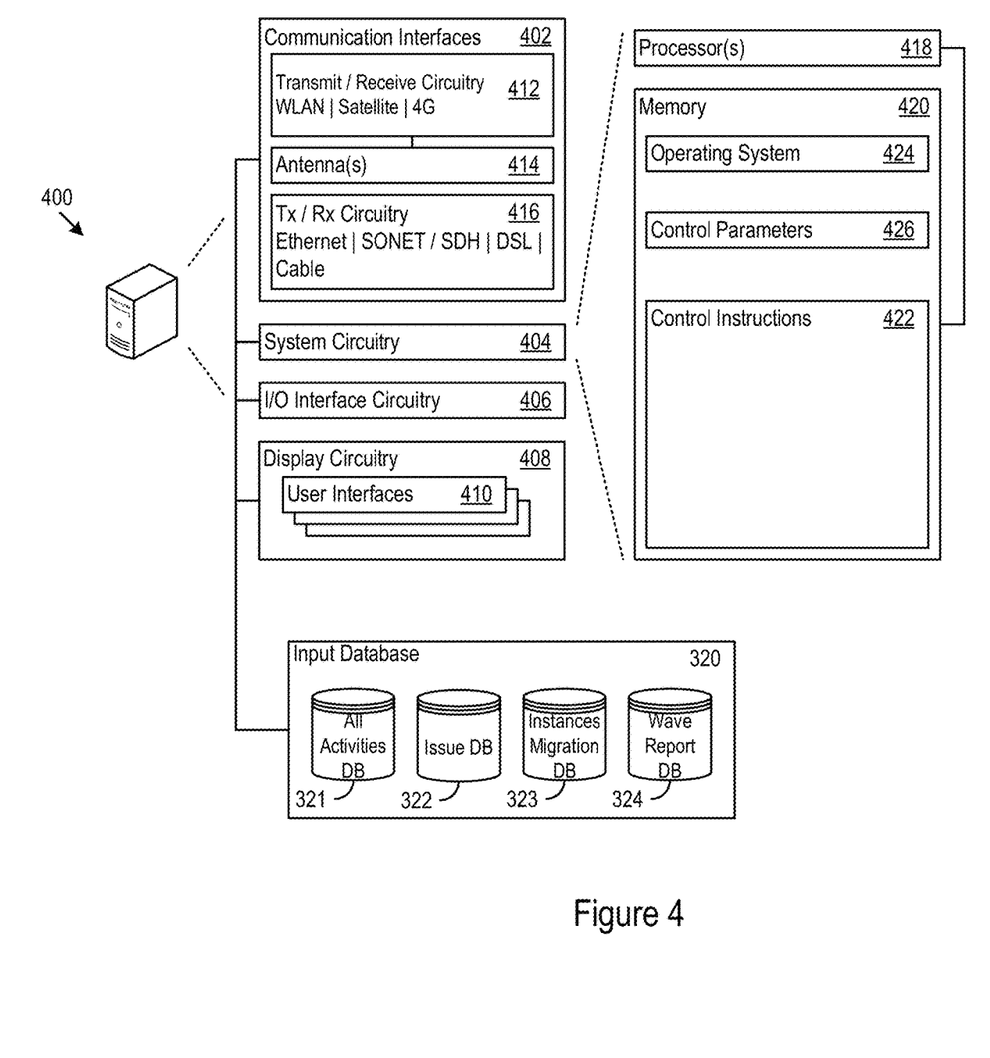
FIG. 4 shows an exemplary computer architecture for a computer device.

FIG. 4 illustrates an exemplary computer architecture of a computer device 400 on which the HCMDRP Engine 310 may be executed. The computer device 400 includes communication interfaces 402, system circuitry 404, input/output (I/O) interface circuitry 406, and display circuitry 408. The graphical user interfaces (GUIs) 410 displayed by the display circuitry 408 may be representative of the GUIs generated by the visualization module 318. The GUIs may be displayed locally using the display circuitry 408, or for remote visualization, e.g., as HTML, JavaScript, audio, and video output for a web browser running on a local or remote machine. Among other interface features, the GUIs 410 may render displays of the predicted delays and delay prediction scores to a user.

The GUIs 410 and the I/O interface circuitry 406 may include touch sensitive displays, voice or facial recognition inputs, buttons, switches, speakers and other user interface elements. Additional examples of the I/O interface circuitry 406 includes microphones, video and still image cameras, headset and microphone input/output jacks, Universal Serial Bus (USB) connectors, memory card slots, and other types of inputs. The I/O interface circuitry 406 may further include magnetic or optical media interfaces (e.g., a CDROM or DVD drive), serial and parallel bus interfaces, and keyboard and mouse interfaces.

The communication interfaces 402 may include wireless transmitters and receivers ("transceivers") 412 and any antennas 414 used by the transmit and receive circuitry of the transceivers 412. The transceivers 412 and antennas 414 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 402 may also include serial interfaces, such as universal serial bus (USB), serial ATA, IEEE 1394, lighting port, $I^2C$, slimBus, or other serial interfaces. The communication interfaces 402 may also include wireline transceivers 416 to support wired communication protocols. The wireline transceivers 416 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 404 may include any combination of hardware, software, firmware, or other circuitry. The system circuitry 404 may be implemented, for example, with one or more systems on a chip (SoC), application specific integrated circuits (ASIC), microprocessors, discrete analog and digital circuits, and other circuitry. The system circuitry 404 may implement any desired functionality of the HCMDRP Engine 310. As just one example, the system circuitry 404 may include one or more instruction processor 418 and memory 420.

The memory 420 stores, for example, control instructions 422 for executing the features of the HCMDRP Engine 310, as well as an operating system 424. In one implementation, the processor 418 executes the control instructions 422 and the operating system 424 to carry out any desired functionality for the HCMDRP Engine 310. The control parameters 426 provide and specify configuration and operating options for the control instructions 422, operating system 424, and other functionality of the computer device 400. The computer device 400 may further include the input database 320.

Figure 6:
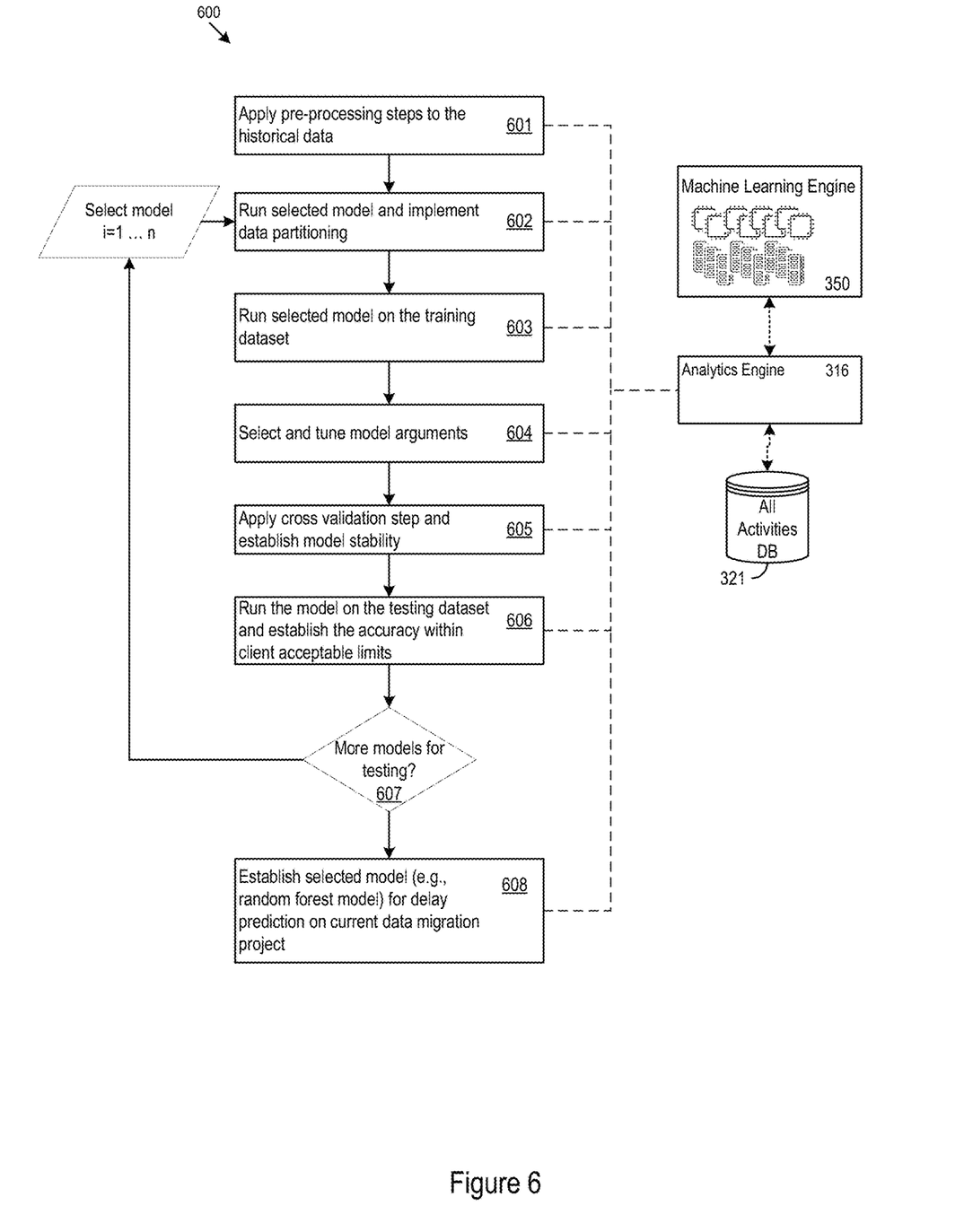
FIG. 6 shows an exemplary flow diagram of logic describing a process implemented for predicting a delay during the cloud migration project.

FIG. 6 illustrates a flow diagram 600 of logic describing a process implemented by the analytics engine 316 to build a model through machine learning techniques, where the model will be applied to later predict delays in the activities of the cloud migration project.

Initially, a number of pre-processing steps are applied on the historical data stored in the all activities DB 321 (601). The pre-processing steps may include one or more of renaming fields, formatting data fields, calculating buffer time, establishing sequence variables, calculating delay times for the historical activities assigned different statuses (e.g., completed, delayed, incomplete, or other similar status), text mining the data to create variables (e.g., "environment", "wave-group", "application", and other similar variables), assigning weights to delay and status fields, and applying treatment to outliers and missing values in the data.

Following the application of the pre-processing steps to the historical data, the analytics engine 316 operates the machine learning engine 350 to run a selected model (e.g., Random Forest, multi linear regression, or the like) on the historical data, and partitions the resulting historical activity statuses (e.g., completed, delayed, incomplete) into either a training dataset or a testing dataset (602). The partitioning may apply an 80/20 split between the training dataset and the testing dataset, respectively.

The analytics engine 316 operates to then run the selected model on the training dataset to obtain a resulting output from the model (603). For example, when the selected model is the Random Forest, running the model includes selecting an optimum number of trees under the random forest model based on the lowest root mean squared error (RMSE) of the resulting output.

The analytics engine 316 selects and tunes other model arguments such as "mtry", "nodesize", and "significant variables" based on, for example, the RMSE on out-of-bag (OOB) samples of the training dataset (604).

Once the error percentage (i.e., accuracy) and fit of the random forest model are established, the analytics engine 316 applies a ten-fold cross validation to establish a model stability of the selected model (605). For example, when the selected model is the Random Forest, the model stability determination looks to make sure the partitions in the Random Forest do not result in an "over-fitting" problem. The analytics engine 316 here operates dynamically by dynamically selecting the model arguments for each run of the selected model.

The analytics engine 316 operates a final model run on the testing dataset to confirm the accuracy and/or fit of the selected model are within client acceptable limits (606). When the accuracy and/or fit of the selected model is not within the client acceptable limits or when there are more models left for consideration (607), a next model may be selected to begin the testing process over again at step (602). When the accuracy and/or fit of the selected model is determined to be within the client acceptable limits or when there are no more models left for consideration (607), selected model is established for use to predict delays in the activities that comprise the current cloud migration project (608). For example, testing has found that the random forest model performed with an overall accuracy of greater than 80%. The random forest model was also found to have performed with a better accuracy for activities with a closer deadline to the current date, when a number of activities within a wave are high, and when a magnitude of the delay is either high or low.

Figure 7:
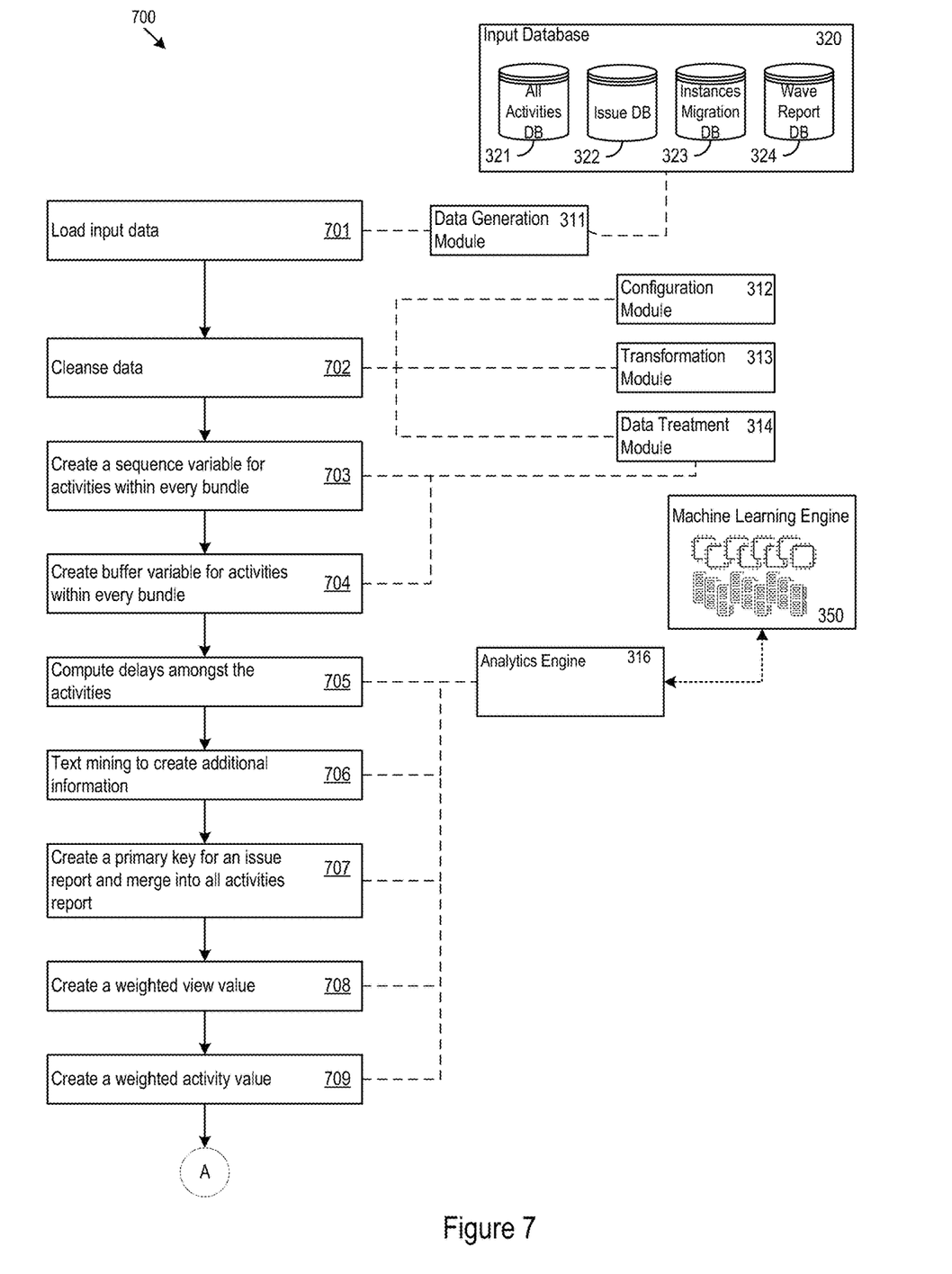
FIG. 7 shows another exemplary flow diagram of logic describing a process implemented for predicting a delay during the cloud migration project.

FIG. 7 illustrates a flow diagram 700 of logic describing a process implemented by the analytics engine 316 to predict delays in activities comprising the current cloud migration project, where the predicted delays utilize the random forest model selected from the process described by flow diagram 600 earlier.

Input files are initially loaded from the input database 320 by the data generation module 311 (701). The input files may be data from the input database 320 describing the activities comprising the cloud migration project.

The input data is then cleansed by the configuration module 312, the transformation module 313, and the data treatment module 314 (702). The cleansing processes may include dropping variables not included in the delay prediction analysis, formatting the variables into a data format acceptable to the analytics engine 316, and excluding observations with "null" values. The cleansing processes may also include excluding failed activities, multiple bundles, and back-outs detected from the activities.

The data treatment module 314 further creates a sequence variable for activities within every bundle of the cloud migration (703). For example, each activity within the bundles may be re-sorted by their respective deadline so that the earliest deadlines are at the top of a stack. This way, a sequence of activities is created for all the activities in each bundle.

The data treatment module 314 further creates buffer variables for activities within every bundle of the cloud migration (704). The buffer variable is calculated as a time between subsequently scheduled activities in the bundle of cloud migration activities. A buffer variable may be calculated for each activity in a bundle that is not the last activity in the bundle sequence of activities.

The analytics engine 316 initiates a computation of delays amongst activities in the cloud migration project (705). For example, delays for completed activities are calculated as:

Delay for completed activity=Completed Date–Activity Deadline.

A delay for a non-completed activity is calculated as:

Delay for non-completed activity=Report Extraction Date–Activity Deadline.

An actual delay for an activity is calculated as:

Actual Delay for an activity=Report Extraction Date–Activity Deadline.

The analytic engine 316 applies text mining to create additional information such as environment information, wave group information, and application information (706).

The analytic engine 316 creates a primary key in an issue report, and perform a merge of the issue report with the all activities report received as an initial input (707). For example, issue information for activities that were delayed causing critical delays in the past may be extracted as the primary key.

The analytic engine 316 creates a weighted view value for partition up groupings of cloud migration waves based on their scheduled migration dates (708). Creating the weighted view value may include first computing a first view value:

View1=Wave date–Extraction date.

Then computing a second view value:

View2=$T7$ (if 0<View1<7), $T30$ (if 7<View1<=30), $T30+$ (if 30<View1).

Then computing the view value as:

View Value=0.5 (if View2=$T7$), 0.3 (if View2=$T30$), 0.2 (if View2=$T30+$), else0.

The analytic engine 316 creates weighted activity value (709). The weighted activity value may be computed as:

View2=0 (if Status=Completed), 0.2 (if Status=Pending/Blocked), 0.3 (if Status=Active), 0.5 (if Status=Ready).

Both the weighted view value and the weighted activity value may be calculated using the uniquely tested algorithms across different migration approaches.

Figure 8:
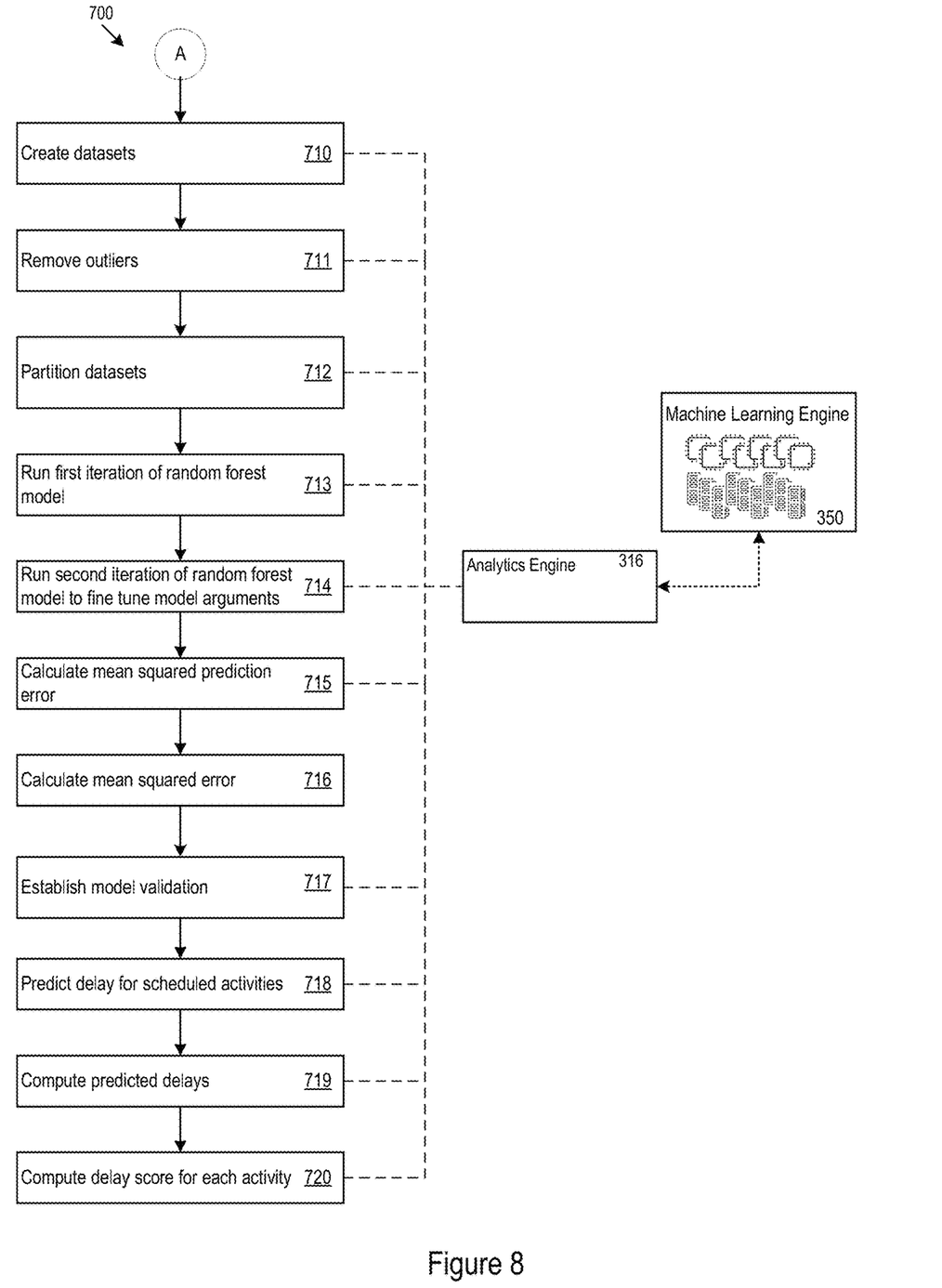
FIG. 8 shows a continuation of the exemplary flow diagram shown in FIG. 7.

FIG. 8 illustrates a continuation of the flow diagram 700. The analytics engine 316 creates datasets for scheduled activities and completed activities and in-progress (CIP) activities (710).

The analytic engine 316 removes outliers from the datasets (711). For examples, activities with actual delays that are greater than the 99.5% percentile are removed as outliers.

The analytics engine 316 partitions the datasets into training datasets and test datasets (712). For example, 80% of the CIP dataset may be partitioned into the training dataset and 20% of the CIP dataset may be partitioned into the test dataset.

The analytics engine 316 runs a first iteration of the random forest model on the partitioned datasets to select an optimum number of trees based on the OOB error rate (713). A dependent variable applied during the first iteration run may be the actual delay for activities. Independent variables applied during the first iteration run may include one or more of the following variables: Migration Wave Group, Wave Manager, Entity Type, Owning Team, Task Visibility, Environment, Sequence, or Status.

The analytics engine 316 runs a second iteration of the random forest model on the partitioned datasets to fine tune model arguments (714). For example, an optimum value for "mtry" may be selected based on a tuning approach. A dependent variable applied during the second iteration run may be the actual delay for activities. Independent variables applied during the second iteration run may include one or more of the following variables: Migration Wave Group, Wave Manager, Entity Type, Owning Team, Task Visibility, Environment, Sequence, or Status.

The analytics engine 316 calculates an RMSE value against the resulting regression line from the iterations of the random forest model (715). The RMSE may be predicted based on OOB samples.

The analytic engine 316 calculates a mean squared error (MSE) as (716):

MSE=mean(Actual Delay−predictedRandomForest (fit))$^2$

The analytics engine 316 establishes model validation and model stability for the random forest model by applying a 10-fold cross-validation process on the results (717).

The analytic engine 316 then predicts the delays for the scheduled activities in the scheduled activity datasets (718).

The analytics engine 316 computes a predicted delay for an activity as (719):

Predicted Delay=Predicted Delay−Buffer Time.

The analytics engine 316 computes a delay score for the activities as (720):

Delay Score=(0.5*View Value)+(0.3*Activity Value)+(0.2*Predicted Delay).

The variables and/or weights assigned during the described delay prediction process of flow diagram 700 may be revised during subsequent runs.

Figure 9:
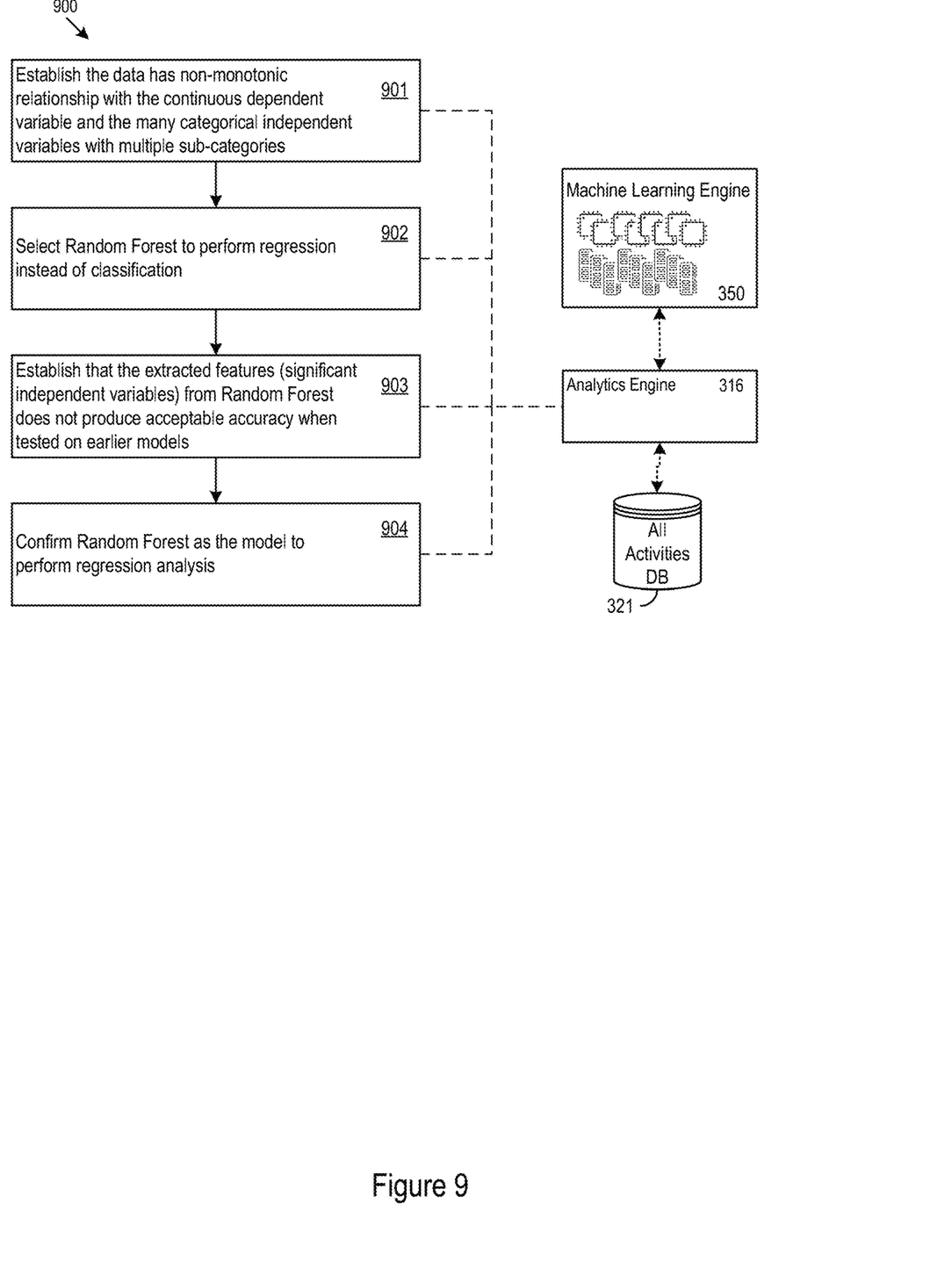
FIG. 9 shows an exemplary flow diagram of logic describing a hybrid modeling approach to applying a random forest model.

Referring back to the iterations of the random forest at steps (713) and (714) in flow diagram 700, FIG. 9 illustrates a flow diagram 900 of logic describing a process for establishing and utilizing the Random Forest model for the delay prediction. The analytics engine 316 applies a hybrid modeling approach when utilizing the Random Forest model, as described by the flow diagram 900.

The analytics engine 316 first establishes the data input to the random forest model has non-monotonic relationship with the continuous dependent variable and the many categorical independent variables with multiple sub-categories (901).

The analytics engine 316 implements the random forest model to perform a regression computation on the generated decision tress of the random forest model, as opposed to a classification computation (902). The regression computation involves calculating an average of all the predicted delays in the resulting decision tree, whereas classification involves the calculation of a mode of all the predicted delays in the resulting decision tree.

The analytics engine 316 establishes that the extracted features (significant independent variables) from the random forest model does not produce acceptable accuracy when tested on other models (903)

The analytics engine 316 confirms the random forest model as the model to perform the regression analysis on the input (e.g., partitioned datasets) (904).

Various implementations have been specifically described. However, other implementations that include a fewer, or greater, number of features for each of the apparatuses, methods, or other embodiments described herein are also possible.

What is claimed is:

1. A system comprising:
   network interface circuitry configured to:
   receive activity data for a cloud migration project; and
   receive historical activity data for previously completed cloud migration projects; and
   an analytics engine configured to:
   group data assigned for migration in bundle units according to bundling rules, the bundling rules comprising client input parameters and historical bundling rules, and assign the bundle units to a cloud migration wave according to wave assignment rules, the wave assignment rules comprising client input parameters and historical wave assignment rules;
   sequence activities included in the activity data according to a respective activity deadline;
   determine buffer times between subsequent activities in the activity data;
   determine delays for activities in the activity data;
   determine a view value for activities in the activity data based on a corresponding time to data wave migration;
   determine an activity value for activities in the activity data based on a corresponding activity status;
   determine a predicted delay of the cloud migration project based on at least a first iteration and a second iteration of a random forest model on the historical activity data for previously completed cloud migration projects, wherein the first iteration selects an optimum number of data trees in the random forest model, and the second iteration fine tunes model arguments in the random forest model; and
   determine a predicted delay score based on a weighted consideration of the predicted delay, the view value, and the activity value.

2. The system of claim 1, wherein the predicted delay is weighted greater than the view value or the activity value in the predicted delay score, and wherein the weighted consideration of the predicted delay is adjusted in association with a subsequent iteration of the random forest model.

3. The system of claim 1, further comprising configuration circuitry configured to:
   format the activity data into a data format acceptable by the analytics engine.

4. The system of claim 1, wherein the analytics engine is further configured to consider historical activity issues related to delays included in the historical activity data when the analytics engine determines the predicted delay.

5. The system of claim 1, further comprising visualization circuitry configured to:
   generate a graphical user interface (GUI) including the predicted delay score, wherein the predicted delay score is displayed on the GUI according to a color coded scheme corresponding predetermined ranges of predicted delay scores to a distinguishable color.

6. The system of claim 5, wherein the visualization circuitry is further configured to:
   detect a selection of a displayed activity on the GUI; and
   display a list of one or more recommended actions for reducing or eliminating a predicted delay of the selected activity.

7. The system of claim 5, wherein the visualization circuitry is further configured to:
   detect a selection of a displayed cloud migration wave; and
   display the bundle units assigned to the selected cloud migration wave in a sequence of scheduled migration.

8. The system of claim 1, wherein the activities are sequenced in each respective bundle according to the respective activity deadline.

9. The system of claim 8, wherein the buffer times are determined between subsequent activities in the activity data of each respective bundle, except for a last activity in each respective bundle.

10. The system of claim 8, wherein the historical wave assignment rules are applied to respective bundles within the migration wave to arrange a sequence for implementation of migration activities corresponding to the respective bundles.

11. A method comprising:
storing activity data for a cloud migration project in a wave report database;
storing historical activity data for previously completed cloud migration projects in an all activities database;
grouping data assigned for migration in bundle units according to bundling rules, the bundling rules comprising client input parameters and historical bundling rules;
assigning the bundle units to a cloud migration wave according to wave assignment rules, the wave assignment rules comprising client input parameters and historical wave assignment rules;
sequencing, by an analytics engine, activities included in the activity data according to a respective activity deadline;
determining, by the analytics engine, buffer times between subsequent activities in the activity data;
determining, by the analytics engine, delays for activities in the activity data;
determining, by the analytics engine, a view value for activities in the activity data based on a corresponding time to data wave migration;
determining, by the analytics engine, an activity value for activities in the activity data based on a corresponding activity status;
determining, by the analytics engine, a predicted delay of the cloud migration project based on at least a first iteration and a second iteration of a random forest model on the historical activity data for previously completed cloud migration projects, wherein the first iteration selects an optimum number of data trees in the random forest model, and the second iteration fine tunes model arguments in the random forest model; and
determining, by the analytics engine, a predicted delay score based on a weighted consideration of the predicted delay, the view value, and the activity value.

12. The method of claim 11, wherein the predicted delay is weighted greater than the view value or the activity value in the predicted delay score, and the method further comprises adjusting the weighted consideration of the predicted delay in association with a subsequent iteration of the random forest model.

13. The method of claim 11, further comprising:
formatting, by configuration circuitry, the activity data into a data format acceptable by the analytics engine.

14. The method of claim 11, wherein determining the predicted delay further comprises considering historical activity issues related to delays included in the historical activity data when the analytics engine determines the predicted delay.

15. The method of claim 11, further comprising:
generating, by visualization circuitry, a graphical user interface (GUI) including the predicted delay score, wherein the predicted delay score is displayed on the GUI according to a color coded scheme corresponding predetermined ranges of predicted delay scores to a distinguishable color.

16. The method of claim 15, further comprising:
detecting, by the visualization circuitry, a selection of a displayed activity on the GUI; and
displaying, by the visualization circuitry, a list of one or more recommended actions for reducing or eliminating a predicted delay of the selected activity.

17. The method of claim 15, further comprising:
detecting, by the visualization circuitry, a selection of a displayed cloud migration wave; and
displaying, by the visualization circuitry, the bundle units assigned to the selected cloud migration wave in a sequence of scheduled migration.

18. A product comprising:
a machine-readable medium other than a transitory signal; and
instructions stored on the machine-readable medium, the instructions configured to, when executed, cause a machine to:
at network interface circuitry:
receive activity data for a cloud migration project; and
receive historical activity data for previously completed cloud migration projects; and
at an analytics engine:
group data assigned for migration in bundle units according to bundling rules, the bundling rules comprising client input parameters and historical bundling rules;
assign the bundle units to a cloud migration wave according to wave assignment rules, the wave assignment rules comprising client input parameters and historical wave assignment rules;
sequence activities included in the activity data according to a respective activity deadline;
determine buffer times between subsequent activities in the activity data;
determine delays for activities in the activity data;
determine a view value for activities in the activity data based on a corresponding time to data wave migration;
determine an activity value for activities in the activity data based on a corresponding activity status;
determine a predicted delay of the cloud migration project based on at least a first iteration and a second iteration of a random forest model on the historical activity data for previously completed cloud migration projects, wherein the first iteration selects an optimum number of data trees in the random forest model, and the second iteration fine tunes model arguments in the random forest model; and
determine a predicted delay score based on a weighted consideration of the predicted delay, the view value, and the activity value.

19. The product of claim 18, wherein the predicted delay is weighted greater than the view value or the activity value in the predicted delay score, and the method further comprises adjusting the weighted consideration of the predicted delay in association with a subsequent iteration of the random forest model.

20. The product of claim 18, where the instructions are further configured to cause the machine to cause the machine to:
at configuration circuitry:
format the activity data into a data format acceptable by the analytics engine.

21. The product of claim 18, where the instructions are further configured to cause the machine to cause the machine to:
at the analytics engine:
consider historical activity issues related to delays included in the historical activity data when the analytics engine determines the predicted delay.

22. The product of claim 18, where the instructions are further configured to cause the machine to:
at visualization circuitry:
generate a graphical user interface (GUI) including the predicted delay score,
detect a selection of a displayed cloud migration wave, and display the bundle units assigned to the selected cloud migration wave in a sequence of scheduled migration.

* * * * *

UNITED STATES PATENT AND TRADEMARK OFFICE
CERTIFICATE OF CORRECTION

PATENT NO. : 10,764,370 B2
APPLICATION NO. : 15/966599
DATED : September 1, 2020
INVENTOR(S) : Madhan Kumar Srinivasan et al.

It is certified that error appears in the above-identified patent and that said Letters Patent is hereby corrected as shown below:

In the Specification

In Column 9, Line 12, delete ""ending"" and insert in its place -- "pending" --.

Signed and Sealed this
Fifteenth Day of December, 2020

Andrei Iancu
*Director of the United States Patent and Trademark Office*